United States Patent [19]
Sampson

[11] Patent Number: 5,324,075
[45] Date of Patent: Jun. 28, 1994

[54] GAS GENERATOR FOR VEHICLE OCCUPANT RESTRAINT

[75] Inventor: William P. Sampson, Mesa, Ariz.

[73] Assignee: TRW Inc., Lyndhurst, Ohio

[21] Appl. No.: 12,560

[22] Filed: Feb. 2, 1993

[51] Int. Cl.⁵ .................. B60R 21/26; C06B 45/10; C06B 31/00
[52] U.S. Cl. .................. 280/736; 280/741; 149/19.9; 149/19.91; 149/35; 149/45
[58] Field of Search ............. 149/19.9, 19.91, 35, 149/45; 423/385; 280/736, 741

[56] References Cited

U.S. PATENT DOCUMENTS

| | | | |
|---|---|---|---|
| 3,107,186 | 10/1963 | Scurlock et al. | 149/19.91 |
| 3,723,205 | 3/1973 | Scheffee | 149/35 |
| 3,950,196 | 4/1976 | Flanagan et al. | 149/92 |
| 4,092,188 | 5/1978 | Lovelace | 149/19.4 |
| 4,203,786 | 5/1980 | Garner | 149/19.91 |
| 4,238,253 | 12/1980 | Garner | 149/19.91 |
| 4,948,439 | 8/1990 | Poole et al. | 280/736 |
| 5,125,684 | 6/1992 | Cartwright | 149/19.7 |
| 5,198,204 | 3/1993 | Bottaro et al. | 423/385 |
| 5,254,324 | 10/1993 | Bottaro et al. | 149/45 |

FOREIGN PATENT DOCUMENTS

91/19670 12/1991 PCT Int'l Appl.

Primary Examiner—Edward A. Miller
Attorney, Agent, or Firm—Tarolli, Sundheim & Covell

[57] ABSTRACT

A vehicle occupant restraint assembly comprises a vehicle occupant restraint (20), a housing (14), gas generating material (16) within the housing, an igniter (18) for the gas generating material, and gas flow means (22) for directing gas from the housing to the vehicle occupant restraint. The gas generating material comprises ammonium dinitramide having the formula:

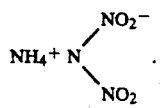

10 Claims, 1 Drawing Sheet

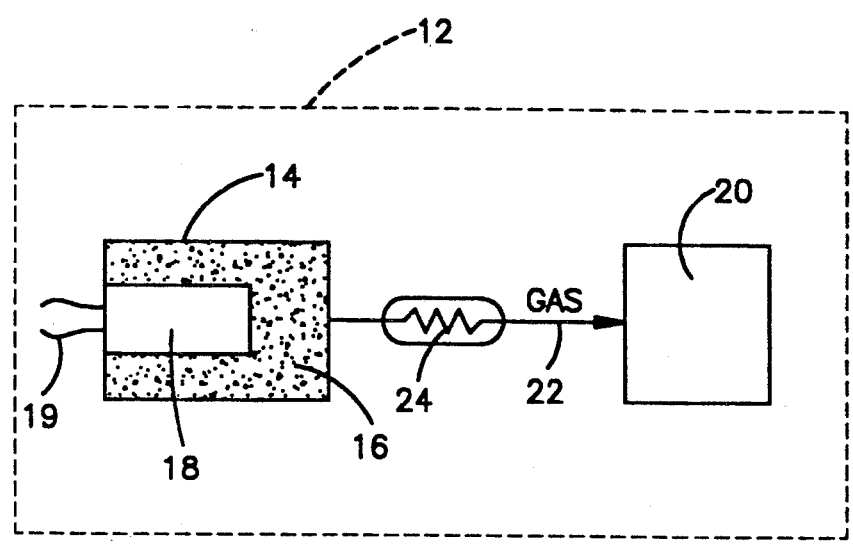
FIGURE

GAS GENERATOR FOR VEHICLE OCCUPANT RESTRAINT

BACKGROUND OF THE INVENTION

1. Technical Field

The present invention relates to a gas generator for a vehicle occupant restraint, such as an air bag, and to the gas generating material used in the gas generator.

2. Description of the Prior Art

A large number of gas generating materials have been proposed for generating gas to operate a vehicle occupant restraint such as an air bag or a pretensioner for a seat belt. For air bags, in particular, materials which produce an inert gas, such as a nitrogen, have been preferred.

There are practical constraints, however, which limit the effectiveness of many nitrogen gas generating materials which have been proposed. The products of reaction other than nitrogen gas, which are produced during combustion of the gas generating materials, should be non-toxic, present in non-toxic amounts or capable of being kept out of or removed from the nitrogen gas. The gas generating material should also be capable of a near instantaneous production of gas, without explosive force or too high a temperature. The gas generating material also has to be safe to handle, and non-combustible, under normal circumstances, except when purposely ignited.

The nitrogen gas generating materials which are currently used contain a metal or an alkali metal component, such as a metal oxidant and/or metal azide. These compounds, on combustion, produce molten or solid reaction products which have to be filtered from the nitrogen gas. Filters for this purpose are expensive, as well as heavy, and add considerably to the cost and weight of the vehicle occupant restraint assembly.

SUMMARY OF THE INVENTION

The present invention resides in a vehicle occupant restraint assembly. The assembly comprises an inflatable vehicle occupant restraint, a housing, a gas generating material within the housing, an igniter for igniting the gas generating material, and gas flow means for directing the gas into vehicle occupant restraint. In a preferred embodiment of the present invention, the vehicle occupant restraint is an air bag. The gas generating material comprises ammonium dinitramide having the formula:

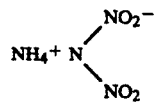

The gas generating material can, if desired, comprise other components, such as a fuel, coolants, a burn rate modifier, additional oxidizers, process/flow aids, or a hydrocarbon binder. Examples of fuels useful with the ammonium dinitramide of the present invention are carbon, an elemental metal fuel, and an azide. Most hydrocarbon binders used in compounding gas generating materials also function as fuels. When used with such other components, the ammonium dinitramide of the present invention preferably constitutes a major proportion of the gas generating material.

The present invention also resides in the above assembly in which the housing and the gas flow means for directing gas from the housing into the vehicle occupant restraint are free of a filter.

BRIEF DESCRIPTION OF THE DRAWINGS

Further features of the present invention will become apparent to those skilled in the art to which the present invention relates, from consideration of the following specification, with reference to the accompanying drawing, in which:

The Figure is a schematic illustration of a vehicle occupant restraint assembly of the present invention.

DESCRIPTION OF PREFERRED EMBODIMENT

Referring to the Figure, the vehicle occupant restraint assembly 12 of the present invention comprises a housing 14. The housing 14 contains a gas generating material 16. The gas generating material 16 is ignited by an igniter 18 operatively associated with the gas generating material 16. Electric leads 19 convey current to the igniter 18 from a sensor which is responsive to a collision. The assembly 12 also comprises a vehicle occupant restraint 20. A gas flow means 22 conveys gas, which is generated by combustion of the gas generating material 16 within housing 14, to the vehicle occupant restraint 20. It is an aspect of the present invention that the occupant restraint assembly 12, including the housing 14 and the gas flow means 22, is free of the filters which are conventionally used in a vehicle occupant restraint to entrap solid particles in the gas flow. However, the gas flow means can comprise, if desired, cooling surfaces 24 comprising, for example, a plurality of mesh screens, to cool the gas.

A preferred vehicle occupant restraint, in the present invention, is an air bag which is inflatable to restrain a vehicle occupant in the event of a collision. Other occupant restraints which can be used in the present invention are inflatable seat belts and seat belt pretensioners.

The gas generating material 16 in the housing 14 can be in the form of a grain of any desired configuration. The gas generating material comprises, predominantly, ammonium dinitramide having the formula:

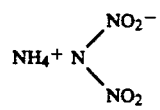

The ammonium dinitramide is an energetic material which, on ignition, decomposes to produce nitrogen, oxygen and water vapor, according to the following equation:

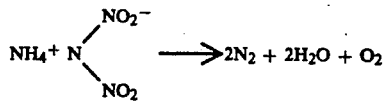

The present invention is not limited to a vehicle occupant restraint assembly of any particular configuration. One configuration suitable for use with the gas generating material of the present invention is disclosed in U.S. Pat. No. 4,902,036 to Zander et al. The assembly disclosed in this patent comprises means for positioning an air bag between an occupant of a vehicle and an interior portion of the vehicle, to protect the occupant from an impact with the interior portion of the vehicle in the event of a collision involving the vehicle. A gas generator, including a housing, produces a sufficient quantity of gaseous combustion products to inflate the air bag. The housing has an igniter which is positioned axially within the housing. The gas generating material is arranged in a donut-shaped configuration around the igniter. On ignition of the igniter, reaction products from the igniter ignite the gas generating material.

The igniter 18 of the present invention can be the same as the igniter shown in the Zander et al. U.S. Pat. No. 4,902,036. This igniter comprises a squib containing a small charge of ignitable combustible material. Electric leads convey a current to the squib. The current generates heat which ignites the small charge of ignitable material. The current is provided when a sensor responsive to an event such as a vehicle collision closes an electrical circuit that includes a power source. The igniter also has a canister containing a rapidly combustible material such as boron potassium nitrate. The rapidly combustible material is ignited by the small charge of ignitable material. Ignition of the rapidly combustible material provides the threshold energy required to ignite the gas generating material which, in the present instance, is ammonium dinitramine. Other well known ignition systems, capable of producing this threshold energy, can also be used.

The ammonium dinitramide of the present invention can be compounded with other ingredients, such as a fuel or binder. Examples of fuels that can be used are carbon, sucrose, an elemental metal fuel, and sodium azide. Examples of elemental metal fuels are aluminum, magnesium, iron, and titanium. The purpose of an added fuel is to tailor the gas generating material to specific gas requirements, such as a minimum volume of gas to be produced within a predetermined time. The purpose of a binder is to hold the particles of ammonium dinitramide together in a desired grain configuration. Most conventional hydrocarbon binders can be used. Most hydrocarbon binders used in the compounding of gas generating materials also function as a fuel.

It is an aspect of the present invention that a binder is not required. Ammonium dinitramine has a melting point of about 100° C. It can be safely heated to its molten state and poured into a desired grain configuration.

In the aforementioned Zander et al. patent, the gas generating material, as mentioned, has a donut configuration. A plurality of donut-shaped grains of gas generating material are axially aligned in a stack. A canister, having the same overall configuration as the stack, holds the grains. The igniter seats within the axial opening of the canister for the grains.

A similar donut-shaped canister can be used in the present invention. However, instead of pressing the gas generating material into donut-shaped grains, with the aid of a binder, and then placing the grains in a canister, the gas generating material can be heated until molten and poured into the canister. The canister is then assembled with the igniter as in the Zander et al. patent. This method of manufacture of the vehicle occupant restraint assembly eliminates the expensive step of pressing the gas generating material into a desired configuration, and significantly reduces the cost of the restraint assembly.

The following Examples illustrate the present invention.

EXAMPLE 1

One hundred grams of ammonium dinitramide contain equal molar proportions of hydrogen, nitrogen and oxygen. On ignition, the ammonium dinitramide produces, for every four moles of gas, 1.6 moles each of nitrogen and water vapor, and 0.8 moles of oxygen. The ignition also produces trace amounts of nitrogen oxides. The products of combustion, at 1,000 psi, have a gas temperature of about 1,700° F., and a total heat content of about 500 calories per gram. The products of combustion, on expansion to one atmosphere pressure, have an approximate temperature of 300° F. and a total heat content of about 200 calories per gram. This temperature and heat content is considered to be suitable for air bag inflation. The trace amounts of nitrogen oxides are considered to be non-toxic.

The ammonium dinitramide of the present invention produces approximately twice the amount of gas produced by the same weight of a gas generating material comprising an azide and metal oxidant. Because the products of combustion of the ammonium dinitramine contains only gaseous components, filtration is not necessary when used in a vehicle occupant restraint assembly. If desired, the products of combustion can be cooled by cooling surfaces in a conventional manner or by addition of coolants to the propellant itself.

EXAMPLE 2

This Example illustrates compounding the ammonium dinitramide of the present invention with an elemental metal fuel. One hundred grams of a gas generating material consisting of 98 weight percent ammonium dinitramine and 2 weight percent elemental (pure crystalline) aluminum fuel, when ignited as in Example 1, produces combustion products containing about 1.6 moles of nitrogen, about 1.6 moles of water vapor, about 0.7 moles of oxygen, and about 0.04 moles of aluminum oxide ($Al_2O_2$). Trace amounts of other reaction products, such as nitrogen oxides, are also produced. The combustion products have a temperature, at 1,000 psi, of about 2,400° F., and a total heat content of about 600 calories per gram. The amount of molten aluminum oxide produced is sufficiently small that filtration of the reaction products is not necessary. The combustion products, on expansion to one atmosphere pressure, have a gas temperature of about 650° F. and a total heat content of about 270 calories per gram. The combustion products when cooled by conventional cooling surfaces, in addition to expansion, are considered to be suitable for inflating an air bag. The trace amounts of other reaction products are considered to be non-toxic.

EXAMPLE 3

This Example illustrates compounding the ammonium dinitramide of the present invention with sodium azide as a fuel. One hundred grams of a gas generating material, consisting of 98 weight percent ammonium dinitramide and 2 weight percent sodium azide, contains approximately the following gram atoms of each element:

| Ingredient | Gram Atoms |
| --- | --- |
| Hydrogen | 3.2 |
| Nitrogen | 3.3 |
| Oxygen | 3.2 |

-continued

| Ingredient | Gram Atoms |
|---|---|
| Sodium | 0.03 |

Combustion of the gas generating material produces a gaseous product comprising the following:

| Ingredient | Mols |
|---|---|
| Nitrogen | 1.6 |
| Water Vapor | 1.6 |
| Oxygen | 0.78 |
| NaOH | 0.03 |

The amount of sodium hydroxide which is produced is considered to be sufficiently small that filtration of the product of combustion is not necessary.

The combustion also produces trace amounts of other compounds such as nitrogen oxides. The trace amounts of other compounds are considered to be non-toxic.

The combustion products have an approximate temperature of 1,800° F. and a total heat content of about 480 calories per gram. On expansion to one atmosphere pressure, the gas temperature is about 370° F., and the heat content is about 210 calories per gram.

Advantages of the present invention should b apparent. The gas generating material of the present invention, on combustion, forms primarily non-toxic gases, primarily nitrogen, oxygen and water vapor. The products of combustion, being gaseous, do not require filtering. Thus, the complex filters of present gas generating apparatus can be eliminated. This reduces the weight and cost of such apparatus.

Also, since the products of combustion are primarily gaseous, less than half of the gas generating material, normally required is needed. The gas generating material is normally a significant percentage of the total weight of a vehicle occupant restraint assembly. Reducing the weight and size of the gas generating material substantially reduces the weight of the assembly.

The gas generating materials of the present invention are readily ignited, without explosive force and without excessively high temperatures. The gas generating materials of the present invention are safe to handle, and are non-combustible, under normal circumstances, and except when purposely ignited.

From the above description of the present invention, those skilled in the art will perceive improvements, changes and modifications. Such improvements, changes and modifications, within the skill of the art, are intended to be covered by the appended claims.

Having described the invention, the following is claimed:

1. A vehicle occupant restraint assembly comprising:
a vehicle occupant restraint;
a housing;
gas generating material within the housing;
an igniter for the gas generating material;
gas flow means for directing gas from said housing to said vehicle occupant restraint, said gas generating material comprising ammonium dinitramide, having the formula:

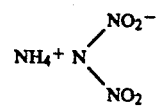

2. The vehicle occupant restraint assembly of claim 1 wherein said vehicle occupant restraint is an air bag.

3. The vehicle occupant restraint assembly of claim 1 wherein said housing and said gas flow means are free of a filter.

4. The vehicle occupant restraint assembly of claim 3 wherein said gas flow means comprises cooling surfaces.

5. The vehicle occupant restraint assembly of claim 4 wherein said cooling surfaces are layers of mesh screens.

6. The vehicle occupant restraint assembly of claim 1 wherein said gas generating material comprises a combustible hydrocarbon binder, the amount of said binder producing, on combustion, non-toxic amounts of carbon oxides.

7. The vehicle occupant restraint assembly of claim 1 wherein said gas generating material comprises a small amount of an alkali metal azide, the amount of alkali metal azide producing, on combustion, molten solids in amounts less than amounts requiring filtration.

8. The vehicle occupant restraint system of claim 1 wherein said gas generating material comprises a small amount of a carbon containing fuel, the amount of fuel producing, on combustion, non-toxic amounts of carbon oxides.

9. The vehicle occupant restraint assembly of claim 1 wherein said gas generating material comprises small amounts of an elemental metal fuel, the amount of metal fuel producing, on combustion, molten solids in amounts less than amounts requiring filtration.

10. The vehicle occupant restraint assembly of claim 1 wherein said gas generating material comprises small amounts of coolants.

* * * * *